United States Patent
Reinhardt et al.

(10) Patent No.: US 9,582,402 B2
(45) Date of Patent: Feb. 28, 2017

(54) REMOTE TASK QUEUING BY NETWORKED COMPUTING DEVICES

(71) Applicant: Advanced Micro Devices, Inc., Sunnyvale, CA (US)

(72) Inventors: Steven K. Reinhardt, Vancouver, WA (US); Michael L. Chu, San Jose, CA (US); Vinod Tipparaju, Austin, TX (US); Walter B. Benton, Austin, TX (US)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 145 days.

(21) Appl. No.: 14/164,220

(22) Filed: Jan. 26, 2014

(65) Prior Publication Data
US 2014/0331230 A1    Nov. 6, 2014

Related U.S. Application Data

(60) Provisional application No. 61/818,351, filed on May 1, 2013.

(51) Int. Cl.
*G06F 9/44*    (2006.01)
*G06F 11/36*   (2006.01)
*G06F 11/34*   (2006.01)
*G06F 9/48*    (2006.01)

(52) U.S. Cl.
CPC ........ *G06F 11/3672* (2013.01); *G06F 9/4843* (2013.01); *G06F 11/34* (2013.01); *G06F 11/3471* (2013.01); *G06F 11/3612* (2013.01); *G06F 11/3419* (2013.01)

(58) Field of Classification Search
None
See application file for complete search history.

(56) References Cited

U.S. PATENT DOCUMENTS 8,015,541 B1 * 9/2011 Srinivasan et al. ........... 717/104

* cited by examiner

*Primary Examiner* — Chuck Kendall
(74) *Attorney, Agent, or Firm* — Park, Vaughan, Fleming & Dowler LLP

(57) ABSTRACT

The described embodiments include a networking subsystem in a second computing device that is configured to receive a task message from a first computing device. Based on the task message, the networking subsystem updates an entry in a task queue with task information from the task message. A processing subsystem in the second computing device subsequently retrieves the task information from the task queue and performs the corresponding task. In these embodiments, the networking subsystem processes the task message (e.g., stores the task information in the task queue) without causing the processing subsystem to perform operations for processing the task message.

20 Claims, 6 Drawing Sheets

REMOTE TASK QUEUING BY NETWORKED COMPUTING DEVICES

RELATED CASES

This application is a non-provisional application from, and hereby claims priority under 35 U.S.C. §119 to, U.S. provisional patent application No. 61/818,351, which is titled "System-wide Execution Model and Global Monitoring and Management Infrastructure for Exascale Computing Systems," by Manish Arora et al., which was filed on 1 May 2013, and which is incorporated by reference.

GOVERNMENT LICENSE RIGHTS

This invention was made with Government support under prime contract number DE-AC02-05CH11231, fixed price subcontract number 7078426 awarded by the DOE. The Government has certain rights in this invention.

BACKGROUND

Field

The described embodiments relate to computing devices. More specifically, the described embodiments relate to remote task queuing in networked computing devices.

Related Art

Some modern computing devices are configured to use a network connection between themselves and another computing device to send tasks (each task comprising one or more computational operations) to the other computing device to be performed by the other computing device. In this way, these computing devices are enabled to offload the tasks to the other computing device, thereby freeing the computing devices to perform other tasks.

In such a computing device, upon encountering a task that is to be sent to another computing device, the computing device (the "sending" computing device) prepares a protocol data unit with information about the task in accordance with a protocol used for the network connection between the computing devices. The sending computing device then sends the protocol data unit to the other computing device (the "receiving" computing device). In the receiving computing device, an operating system executed by a processing subsystem (e.g., a central processing unit (CPU), graphics processing unit (GPU), etc.) processes the protocol data unit to extract the information about the task and then adds the task to a task queue, from where the task is subsequently retrieved and performed.

Sending tasks to receiving computing devices as described above can be inefficient because the operating system (and thus the processing subsystem) in the receiving computing device is required to process the protocol data unit to extract the task information from the protocol data unit. For example, when the processing subsystem is in a lower-power state (sleep, etc.), it may be necessary to transition the processing subsystem to a higher-power state (full power, etc.) to process the received protocol data unit.

BRIEF DESCRIPTION OF THE FIGURES

Throughout the figures and the description, like reference numerals refer to the same figure elements.

DETAILED DESCRIPTION

Figure 1:
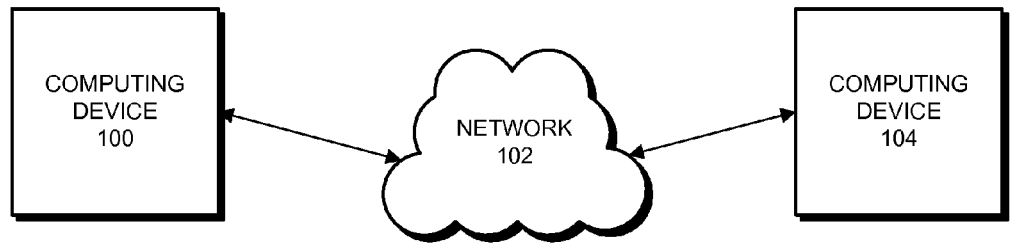
FIG. 1 presents a block diagram illustrating computing devices coupled to a network in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Overview

The described embodiments include a first computing device and a second computing device that are configured to perform tasks (where tasks comprises one or more computational operations) for an application that is executing on one of the computing devices. For example, the first computing device, while performing operations for an application, may encounter a task that is to be performed by the second computing device. The first computing device then communicates a corresponding task message to the second computing device using a network connection between the first and second computing devices. Based on the received task message, the second computing device may perform the task.

In some embodiments, to enable the second computing device to perform tasks based on received task messages, the second computing device includes a task queue and a notification indicator. The task queue is a data structure in a memory for the second computing device that includes a set of entries, each entry configured to hold information about a pending task. Generally, when a task message is received by the second computing device, the second computing device updates an available entry in the task queue with task information acquired from the task message. A processing subsystem in the second computing device subsequently retrieves the task information from the task queue and performs the corresponding task (i.e., performs the corresponding computational operation or operations). The notification indicator includes a mechanism that may be set/triggered (e.g., a flag, a register, an interrupt, etc.) to inform the processing subsystem in the second computing device that a task has been added to the task queue. Upon receiving a task message, in addition to updating the entry in the task queue, the second computing device sets/triggers the notification indicator, which causes the processing subsystem to retrieve the task from the task queue and perform the task.

In some embodiments, in order to avoid the need for the processing subsystem in the second computing device to perform computational work related to processing the task message (e.g., to wake from a sleep/low-power state to process the task message), a networking subsystem in the second computing device is configured to process the task message. For example, upon receiving a task message, the networking subsystem may update an available entry in the task queue using task information acquired from the task message. The networking subsystem may also set/trigger the notification indicator (and perform other operations relating to updating the task queue/processing the task message, as described below). Note that, in these embodiments, the networking subsystem processes the task message without the processing subsystem performing processing operations for processing the task message.

By using the networking subsystem to process the task message without the processing subsystem performing computational operations related to processing the task message, the described embodiments can reduce the number of computational operations to be performed by the processing subsystem. The reduction in the number of computational operations to be performed by the processing subsystem can free the processing subsystem to perform other computational operations, can conserve power (e.g., by maintaining the processing subsystem in a lower-power state and/or by processing the task message in the networking subsystem, which may generally consume less power than the processing subsystem), can reduce traffic on internal signal routes (e.g., busses, etc.) in the second computing device, and/or can more quickly process task messages (e.g., if the processing subsystem must be awoken from a sleep/low-power state before the processing can start).

Computing Devices

FIG. 1 presents a block diagram illustrating a first computing device and a second computing device coupled to a network in accordance with some embodiments. More specifically, as can be seen in FIG. 1, computing device 100 and computing device 104 are coupled to network 102.

Computing devices 100 and 104 are electronic devices that are configured to perform computational operations. Computing devices 100 and 104 can be, or can be included in any of a number of different electronic devices such as a desktop computer, a laptop computer, a server, a computing node, a media player, an appliance, a subnotebook/netbook, a tablet computer, a cellular phone, a piece of testing equipment, a network appliance, a set-top box, a personal digital assistant (PDA), a smart phone, a toy, a controller, or another device. For example, in some embodiments, computing devices 100 and 104 are server computer systems. As another example, in some embodiments, computing devices 100 and 104 are computational nodes coupled to a common backplane.

Network 102 includes signal routes configured to enable computing device 100 and 104 to communicate electronically with one another (and possibly other devices on the network). In some embodiments, network 102 includes one or more wired or wireless networks such as a personal area network (PAN), a local area network (LAN), a wide area network (WAN), the Internet, etc. For example, in some embodiments, computing devices 100 and 104 are a server computers and network 102 is a LAN (e.g., an Ethernet network, Wi-Fi network, etc.). In some embodiments, network 102 includes basic signal routes. For example, network 102 may include electrical/optical/electro-optical signal lines in the above-described backplane.

In the described embodiments, computing devices 100 and 104 perform "tasks" (i.e., computational operations) for an application executing on one of the computing devices. For example, computing device 104 may execute an application that offloads/sends certain types of tasks to computing device 100 to be performed by computing device 100. In these embodiments, the computing devices may communicate using network 102 to enable the performance of the tasks. For example, task messages may be used to communicate task information, control/response messages may be used to communicate control/response information, result messages may be used to communicate information about the result(s) of tasks, and/or other communications may be performed.

Figure 2:
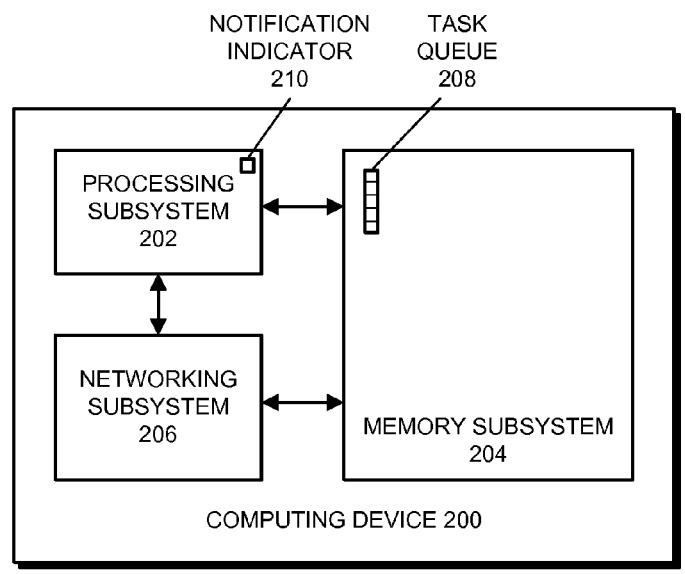
FIG. 2 presents a block diagram illustrating a computing device in accordance with some embodiments.

FIG. 2 presents a block diagram illustrating a computing device 200 in accordance with some embodiments. In some embodiments, at least one of computing devices 100 and 104 includes functional blocks (i.e., an internal arrangement) similar to those shown in computing device 200.

As shown in FIG. 2, computing device 200 includes processing subsystem 202, memory subsystem 204, and networking subsystem 206. Processing subsystem 202 is a functional block that is configured to perform computational operations in computing device 200. For example, processing subsystem 202 can include, but is not limited to, one or more processors and/or processor cores (e.g., central processing unit (CPU) cores, graphics processing unit (GPU) cores, etc.), application-specific integrated circuits (ASICs), microcontrollers, and/or programmable-logic devices.

Memory subsystem 204 is a functional block that is configured to store data and/or instructions for use by processing subsystem 202 and/or networking subsystem 206. For example, memory subsystem 204 can include, but is not limited to, one or more of static random access memory (SRAM), dynamic random access memory (DRAM), double data rate synchronous DRAM (DDR SDRAM), flash memory, and/or other types of memory circuits, along with circuits for controlling access to the memory. In some embodiments, memory subsystem 204 includes a memory hierarchy with an arrangement of one or more caches coupled to one or more memories. In some of these embodiments, processing subsystem 202 also includes one or more caches in the memory hierarchy. In addition, in some embodiments, memory subsystem 204 is coupled to one or more high-capacity mass-storage devices (not shown). For example, memory subsystem 204 may be coupled to a magnetic or optical drive, a solid-state drive, and/or another type of mass-storage device.

Networking subsystem 206 is a functional block configured to access, couple to, and communicate on one or more wired and/or wireless networks. For example, networking subsystem 206 can include, but is not limited to, a Bluetooth™ networking system, a cellular networking system (e.g., EDGE, UMTS, HSDPA, LTE, etc.), a universal serial bus (USB) networking system, a networking system based on the standards described in Institute for Electrical and Electronic Engineers (IEEE) 802.11 (i.e., an 802.11-based wireless network), a networking system based on the standards described in Institute for Electrical and Electronic Engineers (IEEE) 802.3 (i.e., an Ethernet networking system), a personal-area networking (PAN) system (e.g., a network based on the standards described in IEEE 802.15, etc.), and/or basic signal routes (e.g., electrical, optical, or electro-optical connections in a circuit board to which computing device 200 is connected). Networking subsystem 206 includes controllers, radios/antennas for wireless network connections, sockets/plugs for hard-wired electrical connections, and/or other devices used for coupling to, communicating on, and handling data and events on a wired and/or wireless network.

Figure 3:
FIG. 3 presents a block diagram illustrating an entry for a task queue in accordance with some embodiments.

In some embodiments, memory subsystem 204 includes a task queue 208. Task queue 208 is a queue data structure (e.g., a first-in-first-out (FIFO) queue, a last-in-first-out (LIFO) queue, a linked list, and/or another type of queue data structure) stored in memory circuits in memory subsystem 204. Task queue 208 includes a number of entries that are configured for storing information about tasks to be performed in computing device 200. To perform a task, processing subsystem 202 and/or another functional block in computing device 200 retrieves stored task information from task queue 208 and uses the task information to determine the task that is to be performed. FIG. 3 presents a block diagram illustrating an entry 300 for task queue 208 in accordance with some embodiments. As can be seen in FIG. 3, entry 300 includes a task code 302 and metadata 304. Task code 302 includes information that enables processing subsystem and/or other functional blocks in computing device 200 to determine the task that is to be performed. For example, the tasks can be computational operations such as mathematical operations, vector operations, logical operations, function calls (i.e., executing a specified function), method calls, and/or other operations, and the task code can be set accordingly (e.g., to a specified numerical code, bit pattern, function pointer, etc.). Metadata 304 includes one or more of: (1) general information about entry 300 such as control information, validity information, etc., and (2) task-related information to be used when performing the task such as input parameters, pointers/references to data for the task, control values for the task, task code extensions, etc. For example, if the task is performing a single-instruction-multiple-data (SIMD) logical operation on a number of blocks of data in memory (e.g., words, double words, etc.), metadata 304 for the corresponding entry 300 may include a base address indication (e.g., pointer or reference) and a value indicating the number of blocks on which the SIMD operation is to be performed, as well as possibly including input data for the logical operation and/or a pointer to input data. More generally, each entry 300 in task queue 208 includes sufficient information to enable processing subsystem 202 and/or other functional blocks in computing device 200 to determine a corresponding task.

In some embodiments, task queue 208 is a fixed size, and thus the number of entries 300 is fixed (e.g., at 16, 28, or another number). In these embodiments, task queue 208 may initially be allocated a corresponding block of memory and may use the allocated block of memory as described herein. However, in some embodiments, task queue 208 is not a fixed size, but is dynamically adjusted in size according to the number of tasks to be stored therein. In these embodiments, task queue 208 may be initially allocated a block of memory and then may be subsequently increased in size by allocating additional memory for task queue 208 as the need for more entries arises or decreased in size by deallocating memory from task queue 208 when the blocks are not being used.

In some embodiments, functional blocks in computing device 200 that are to use task queue 208 are provided with and/or maintain records of the location, size, and/or the number of tasks in task queue 208. For example, one or more functional blocks may maintain or be provided (e.g., by computing device 200) a pointer to a base of task queue 208 (a "head" pointer), a pointer to the most recently added task in task queue 208 (a "tail" pointer), a count of the number of active entries in task queue 208, and/or other information about task queue 208.

In some embodiments, processing subsystem 202 includes notification indicator 210. Notification indicator 210 is a mechanism that is used to inform processing subsystem 202 when tasks are available in task queue 208. For example, in some embodiments, notification indicator includes a memory element such as a register (e.g., a "doorbell" register), a flag, etc. that is set to a given value or updated to signal processing subsystem 202 that one or more tasks are available in task queue 208. As another example, in some embodiments, notification indicator 210 is part of an interrupt processing mechanism in processing subsystem 202. In these embodiments, when a task is placed in task queue 208, notification indicator 210 can be triggered (e.g., an interrupt can be caused, the register can be updated, etc.) to inform processing subsystem 202 that the task is in task queue 208.

In these embodiments, upon receiving an indication that notification indicator 210 has been triggered (i.e., set/updated, asserted, caused, etc., depending on the implementation), processing subsystem 202 may retrieve the next available task from the task queue 208 and perform the task. For example, in some embodiments, processing subsystem 202 may be in a lower-power state (e.g., sleep, etc.), but may monitor notification indicator 210 to determine when notification indicator 210 has been triggered. Upon determining that notification indicator 210 has been triggered, processing subsystem 202 may transition to a higher-power state (e.g., full-power, etc.) to retrieve the available task from the task queue 208 and perform the task. In some embodiments, when monitoring notification indicator 210, processing subsystem 202 may periodically poll or check notification indicator 210 and process available tasks accordingly. In these embodiments, multiple entries 300 in task queue 208 may have been updated to include information about available tasks in the period between checks and processing subsystem 202 may retrieve the information and perform the corresponding tasks in a specified order (FIFO, LIFO, etc.).

Within computing device 200, processing subsystem 202, memory subsystem 204, and networking subsystem 206 (collectively, "the subsystems") are coupled together by signal routes. The signal routes generally include one or more signal lines, transmitters/receivers, controllers, etc. that the subsystems can use to communicate with one another. For example, the signal routes can include one or more of buses, wires, optical connections, proximity connections, through-silicon vias, etc. In FIG. 2, various signal routes are illustrated using lines with arrowheads (although different arrangements of signal routes may be used in other embodiments).

Computing device 200 can be, or can be incorporated into, any of a number of different types of electronic devices. Generally, these devices include any device that can perform the operations herein described. For example, computing device 200 can be, or can be incorporated into, a desktop computer, a laptop computer, a server, a computing node, a media player, an appliance, a subnotebook/netbook, a tablet computer, a cellular phone, a piece of testing equipment, a network appliance, a set-top box, a personal digital assistant (PDA), a smart phone, a toy, a controller, or another device.

Although embodiments are described using a particular number and arrangement of functional blocks, some embodiments include a different number and/or arrangement of functional blocks. For example, some embodiments include two, five, or another number of processing subsystems 202. As another example, in some embodiments, computing device 200 includes additional functional blocks. For example, computing device 200 may include, but is not limited to, one or more power systems (batteries, plug-in power sources, etc.), media processors, input-output mechanisms, communication mechanisms, display mechanisms, etc. As another example, one or both of notification indicator 210 and task queue 208 may be located elsewhere in computing device 200. For instance, in some embodiments, task queue 208 is included in separate, dedicated memory circuits. As yet another example, in some embodiments, computing device 200 includes multiple task queues 208, each of which has a corresponding notification indicator 210. In these embodiments, one or more of the task queues 208 may be dedicated to different applications (i.e., a task queue may hold tasks to be performed by a corresponding application), different priority levels (i.e., each task queue may hold tasks of a corresponding priority, with higher priority tasks being performed in a specified relationship to lower priority tasks), different processing subsystems (in a multi-processing subsystem implementation), etc. Generally, the described embodiments can include any arrangement of functional blocks that can perform the operations herein described.

Operating System and Applications

Figure 4:
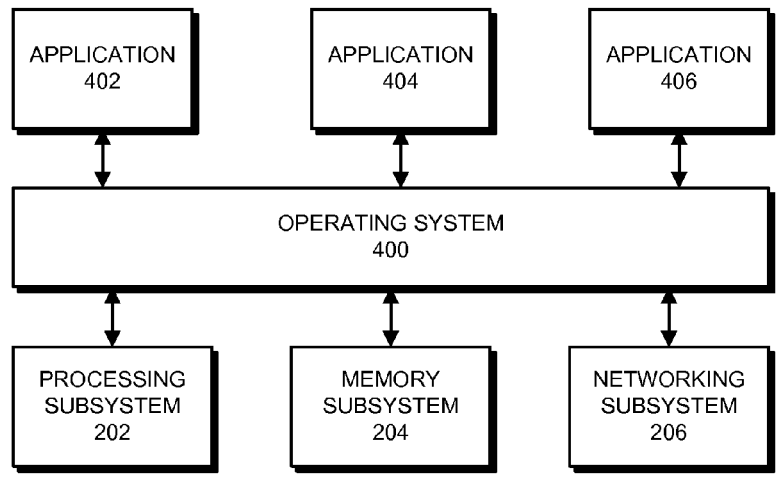
FIG. 4 presents a block diagram illustrating an operating system and applications in accordance with some embodiments.

FIG. 4 presents a block diagram illustrating an operating system 400 and applications 402-406 in accordance with some embodiments. Generally, operating system 400, which is executed by a processing subsystem 202 on a computing device 200 (recall that either of computing devices 100 and 104 can have an internal arrangement similar to computing device 200), serves as an intermediary between hardware (e.g., subsystems 202-206) and software (e.g., applications, programs, drivers, and other software) in the computing device 200 and applications 402-406 executed by processing subsystem 202. Operating system 400 provides known interfaces and mechanisms (e.g., application program interfaces (APIs), etc.) that enable applications 402-406 to communicate with operating system 400 when performing computational operations. Operating system 400 can be, but is not limited to, the OS X operating system from Apple Inc. of Cupertino, Calif., the Windows operating system from Microsoft, Inc. of Redmond, Wash., a Unix or Unix-like operating system (e.g., Linux, etc.), and/or another operating system. Aside from the operations herein described, operating systems and their general functions are known in the art and hence are not described in detail.

Applications 402-406 are software programs that execute on a computing device 200 (e.g., are executed by processing subsystem 202 using instructions and/or data from memory subsystem 204). In some embodiments, applications 402-406 may be any applications that can handle tasks as herein described. For example, applications 402-406 may be one or more of scientific computing applications, games, graphics rendering applications, distributed computing applications, media processing applications, office productivity applications, etc.

In some embodiments, application 402 (and/or applications 404 and/or 406) is configured to monitor for specified tasks while performing computational operations. Generally, the specified tasks include any tasks are to be offloaded to other computing devices to performed by the other computing devices. For example, in some embodiments application 402 is configured to monitor for certain types of SIMD or mathematical (e.g., vector, matrix, etc.) operations, function calls, etc. that are to be offloaded to another computing device to be performed therein. Upon encountering such a task, application 402 generates a task message that describes the task. Application 402 then forwards the task message to networking subsystem 206, where the task message is processed to form a protocol data unit (e.g., one or more packets, messages, or data bundles that include the task message that are formatted in accordance with an underlying network protocol). For example, in some embodiments, the task message may be formatted in a protocol data unit for remote direct memory access (RDMA). From networking subsystem 206 (i.e., via appropriate network interface hardware in networking subsystem 206), the protocol data unit is forwarded to the other computing device, where the task message is processed as described herein. In this way, application 402 (and/or applications 404 and/or 406) can communicate task messages to the other computing device to be processed by the other computing device. Note that, in these embodiments, application 402 communicates with networking subsystem 206 without operating system 400 performing operations related to the forwarding of the task message to the other computing device (other than handling basic application 402-to-networking subsystem 206 communication). That is, in these embodiments, application 402 formats the task message and passes the task message to networking subsystem 206 for subsequent processing therein. However, in some embodiments, operating system 400 performs one or more operations relating to the processing of the task message to form the protocol data unit. Generally, in the described embodiments, the protocol data unit and the underlying task message are generated by some combination of application 402, operating system 400, and/or networking subsystem 206.

Although embodiments are described using applications 402-406, in some embodiments different types and/or numbers of applications may be present. In addition, although shown in FIG. 4 separately from operating system 400, in some embodiments, one or more of applications 402-406 are applications, daemons, utilities, routines, etc. (collectively, "utilities") included within operating system 400 (i.e., installed and executed as part of operating system 400, perhaps without a user manually executing the utility).

Tasks

As described herein, processing subsystems 202 and/or other functional blocks in computing devices perform tasks. Generally, tasks include any computational operation or combination of computational operations that can be performed by processing subsystems 202 and/or other functional blocks in computing devices. For example, the tasks may include mathematical operations (e.g., addition/subtraction, multiply/divide, square root, matrix operations, etc.), vector operations (e.g., operations performed on one or more elements of vector data), logical operations (e.g., logical ANDs, XORs, INV, etc.), and bitwise operations (e.g., rotate, switch, mask, etc.) on one or more portions of data (e.g., bytes, words, double words, vectors, cache blocks, memory blocks, pages, etc.) alone or in parallel (e.g., SIMD, vector operations, etc.). As another example, the tasks may include execution of sections of program code that include one or more lines of program code, such as function calls, method calls, subroutine execution, program execution, etc., with or without input data, etc.

In some embodiments, the tasks further include any type of computational operation or combination thereof that can be encountered while executing compiled or interpreted program code for an application and sent to another computing device for performance. For example, while executing program code for an application, processing subsystem 202 in computing device 100 may encounter a computational operation such as a logical operation that is to be performed for a portion of data (e.g., for a number of bytes) or a function call. Processing subsystem 202 in computing device 100 may then generate a task message that describes the task and communicate the task message to computing device 104. Upon receiving the task message, networking subsystem 206 in computing device 104 may then update an entry 300 in task queue 208 in computing device 104, from where a processing subsystem 202 in computing device 104 retrieves the task information and performs the corresponding computational operation(s).

Task Messages

Figure 5:
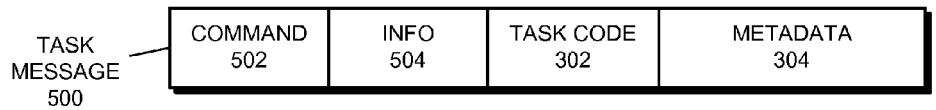
FIG. 5 presents a block diagram illustrating a task message in accordance with some embodiments.

As described above, in some embodiments, task messages are communicated between a sending computing device (e.g., computing device 100) and a receiving computing device (e.g., computing device 104) to enable the sending computing device to communicate information to the receiving computing device about tasks that are to be performed by the receiving computing device. FIG. 5 presents a block diagram illustrating a task message 500 in accordance with some embodiments. As can be seen in FIG. 5, task message 500 includes command 502, information 504 (shown as "INFO 504"), task code 302, and metadata 304. As described above, task code 302 and metadata 304 are information that are stored in an entry in task queue 208 to enable a processing subsystem 202 and/or another functional block to perform a corresponding task. Command 502 includes a command indicator such as a numerical value, bit pattern, code, etc. that a networking subsystem 206 in a receiving computing device uses to determine the nature of the command (and, more generally, the task message 500). For example, in some embodiments, command 502 includes a write/store command that causes the networking subsystem 206 to write the command to a location in memory (i.e., to task queue 208). Information 504 includes information relating to the task message such as an identifier of the location in memory (i.e., a base of task queue 208, an open entry in task queue 208, a general identifier for the task queue 208, and/or another identifier), a length of the task message, and/or other information used to process the task message in a receiving computing device.

In some embodiments, task message 500 is configured as a TASK PUT command, which is an extension of the RDMA standard. For the TASK PUT command, command 502 includes an indication that the command is a TASK PUT command (e.g., a numerical value, a bit pattern, a code, etc.) and information 504 includes information used to identify the memory location (i.e., task queue 208) to which the payload of task message 500 (i.e., code 302 and metadata 304) is to be written. In these embodiments, the TASK PUT command causes a networking subsystem 206 in a receiving computing device to write the payload of task message 500 to task queue 208, similarly to an RDMA PUT command. However, the TASK PUT command additionally causes the networking subsystem 206 in the receiving computing device to perform operations for processing task message 500 (i.e., for handling the writing of the payload from task message 500 to task queue 208). For example, in some embodiments, the TASK PUT command causes the networking subsystem 206 to verify that task queue 208 has an available entry 300 before performing the write operation. Also, in some embodiments, when executing the TASK PUT command, after performing the write operation, the networking subsystem 206 updates an indicator for task queue 208 to indicate that the entry 300 in task queue 208 was updated (e.g., updates a tail pointer for the task queue, a variable that holds a record of the size of the task queue, and/or other updates). In addition, in some embodiments, the TASK PUT command causes the networking subsystem 206 to trigger a notification indicator 210. Using the TASK PUT command extension to the RDMA standard for configuring task message 500 enables task message 500 to be processed in networking subsystem 206 without corresponding processing in operating system 400 (i.e., without performing processing operations in processing subsystem 202). Thus, the networking subsystem 206 in a receiving computing device may interpret a received task message 500 as a task message, acquire the payload from the task message 500, and write the payload to an available entry in task queue 208 without causing processing subsystem 202 to perform processing operations for handling task message 500.

In some embodiments, in addition to performing the above-described operations to handle task message 500, networking subsystem 206 in the receiving computing device may send messages to the sending computing device in response to task message 500. For example, if a received task message 500 has an error, if a payload from a received task message cannot be written to task queue 208 (e.g., task queue 208 is full, invalid, cannot be written, etc.), if the task cannot be processed by processing subsystem 202, etc., networking subsystem 206 in the receiving computing device may send a corresponding response message to the sending computing device. For instance, the response message may include a negative acknowledgement or NACK response message when the task will not be performed in the receiving computing device for the above-described reasons. As another example, in some embodiments, the networking subsystem 206 in the receiving computing device sends an acknowledgement or ACK response message if the payload from a received task message 500 is successfully written to task queue 208. These response messages may be formatted using any protocol for which messages can be generated in the networking subsystem 206 of the receiving computing device, and for which the receiving computing device (e.g., the networking subsystem 206, the operating system 400, and/or the application 402-406 in the receiving computing device) can process the response message. As with the task message 500, in some embodiments, response messages are generated in networking subsystem 206 without processing subsystem 202 performing processing operations for generating response messages.

In some embodiments, to enable networking subsystem 206 in a receiving computing device to process task messages, networking subsystem 206 includes a control mechanism that handles task messages 500 with regard to other task messages 500 in the receiving computing device to avoid errors and incorrect processing of corresponding tasks. For example, the control mechanism may enforce an order between task messages (using, e.g., timestamps, message identifiers, a message counter, etc. in the received task messages 500 and/or the protocol data unit in which task message 500 is included) when writing payloads from task messages 500 to task queue 208. As another example, the control mechanism may handle the size of task queue 208, allocating and deallocating memory as needed to enable the use of task queue 208.

Sending and Receiving Task Messages

As described above, a sending computing device can send a task message 500 to a receiving computing device in an attempt to cause the receiving computing device to store task information for a corresponding task in a task queue 208—and thus to subsequently perform the corresponding task.

Figure 6:
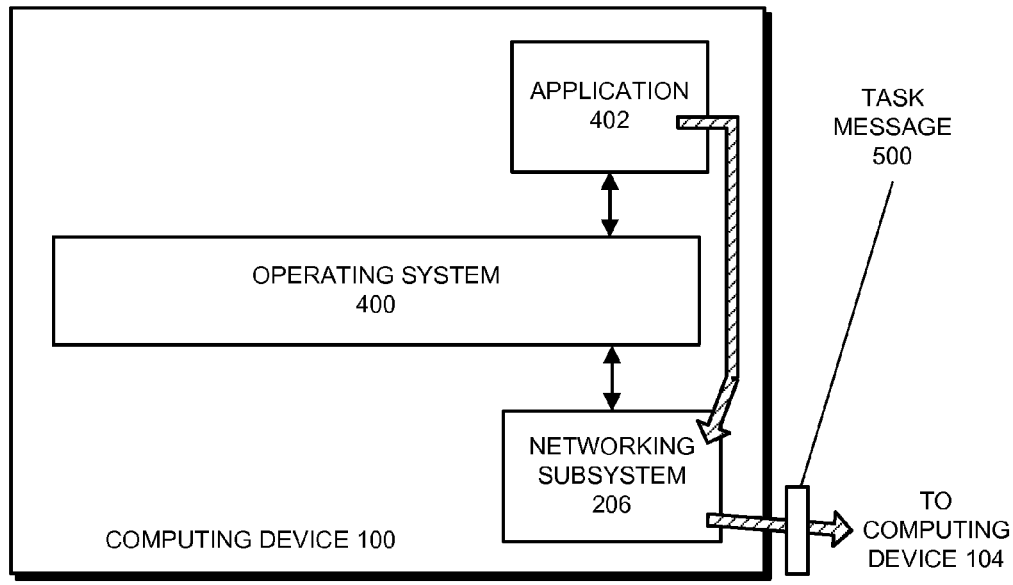
FIG. 6 presents a block diagram illustrating a computing device sending a task message in accordance with some embodiments.

FIG. 6 presents a block diagram illustrating a sending computing device (computing device 100 for this example) sending a task message to a receiving computing device (computing device 104 for this example) in accordance with some embodiments. Note that the operations shown in FIG. 6 are presented as a general example of functions performed by some embodiments. The operations performed by other embodiments include different operations and/or operations that are performed in a different order. Additionally, although certain functional blocks/mechanisms are used in describing the operations, in some embodiments, other functional blocks/mechanisms may be used. For example, only some of the elements in FIG. 4 are shown in FIG. 6, but in some embodiments, all of the elements would be present.

The operations shown in FIG. 6 start when application 402, which is executing on computing device 100, encounters a task that is to be performed by computing device 104. For this example, it is assumed that the task is a vector logical operation (e.g., an AND operation) that is to be performed as part of the execution of the application, but is to be offloaded to, and thus performed by, computing device 104 on a block of data. Application 402 then generates a task message 500 that includes a task code 302 indicating the vector logical operation (e.g., a numerical value indicating the vector logical operation), metadata 304 indicating the block of data (e.g., a pointer to a base address for the block of data and a size of the block of data), in a write command (e.g., a TASK PUT command) in command 502, and information 504 associated with the task and/or task message 500.

Application 402 then sends the generated task message 500 to networking subsystem 206. Networking subsystem 206 includes the task message 500 in a protocol data unit for the network protocol used for communicating between computing device 100 and computing device 104, and transmits the protocol data unit via network 102 to computing device 104. Note that, in these embodiments, application 402 sends the task message 500 to networking subsystem 206 "directly," with minimal processing in operating system 400, so that application 402 and networking subsystem 206 perform most, if not all, of the operations for generating task message 500 (and the corresponding protocol data unit). However, as described above, in some embodiments, operating system 400 performs one or more operations for generating the protocol data unit in which task message 500 is included.

Figure 7:
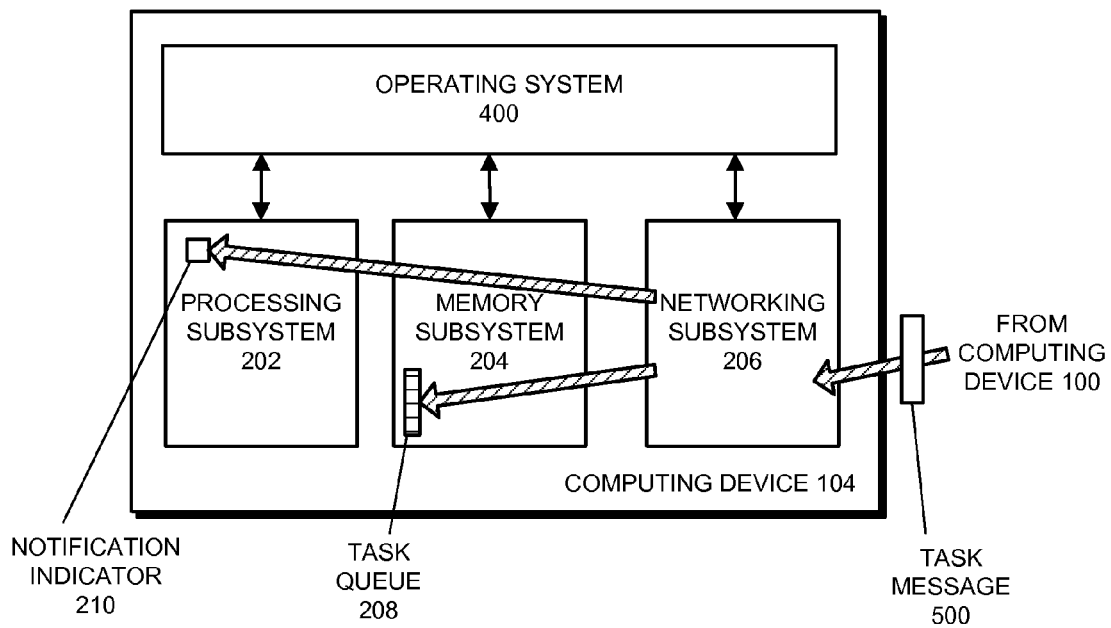
FIG. 7 presents a block diagram illustrating a computing device receiving a task message in accordance with some embodiments.

FIG. 7 presents a block diagram illustrating a receiving computing device (computing device 104 for this example) receiving a task message sent by a sending computing device (computing device 100 for this example) in accordance with some embodiments. Note that the operations shown in FIG. 7 are presented as a general example of functions performed by some embodiments. The operations performed by other embodiments include different operations and/or operations that are performed in a different order. Additionally, although certain functional blocks/mechanisms are used in describing the operations, in some embodiments, other functional blocks/mechanisms may be used. For example, only some of the elements in FIG. 4 are shown in FIG. 7, but in some embodiments, all of the elements would be present.

The operations shown in FIG. 7 start when networking subsystem 206 in computing device 104 receives task message 500 from computing device 100. For example, computing device 100 may send task message 500 in a protocol data unit formatted in accordance with a protocol that computing devices 100 and 104 use to communicate with one another (e.g., RDMA). Networking subsystem 206 processes task message 500 and determines, based on command 502 and/or information 504, that the message is a task message 500. Upon determining that the message is a task message 500, networking subsystem 206 checks task queue 208 to determine if the payload from task message 500 can be written to task queue 208. For example, networking subsystem 206 may check to determine if there is an available entry 300 in task queue 208, that task queue 208 is available for writing (e.g., is not busy, corrupt, invalid, etc.), and/or may perform other checks for task queue 208. For this example, it is assumed that an entry 300 is available, task queue 208 can be written, etc. so that the payload from task message 500 can be written to the task queue 208.

Networking subsystem 206 next extracts the payload, including task code 302 and metadata 304, from task message 500 and writes the payload into an available entry 300 in task queue 208. After writing the payload to task queue 208, networking subsystem 206 updates an indicator and/or other metadata for task queue 208 to indicate that the entry 300 in task queue 208 was updated (e.g., updates a tail pointer for the task queue, updates a variable that holds a record of the size of the task queue, and/or updates other indicators/metadata). Networking subsystem 206 also triggers (i.e., sets, updates, causes, etc.) notification indicator 210, thereby notifying processing subsystem 202 that a task is available in task queue 208. Processing subsystem 202 subsequently retrieves the task information from the entry 300 and performs the corresponding task.

In some embodiments, after writing the payload from task message 500 to task queue 208, networking subsystem 206 sends a response message 800 (e.g., an acknowledgement (ACK) or another response message) to computing device 100 indicating that the task information was successfully written to task queue 208.

Figure 8:
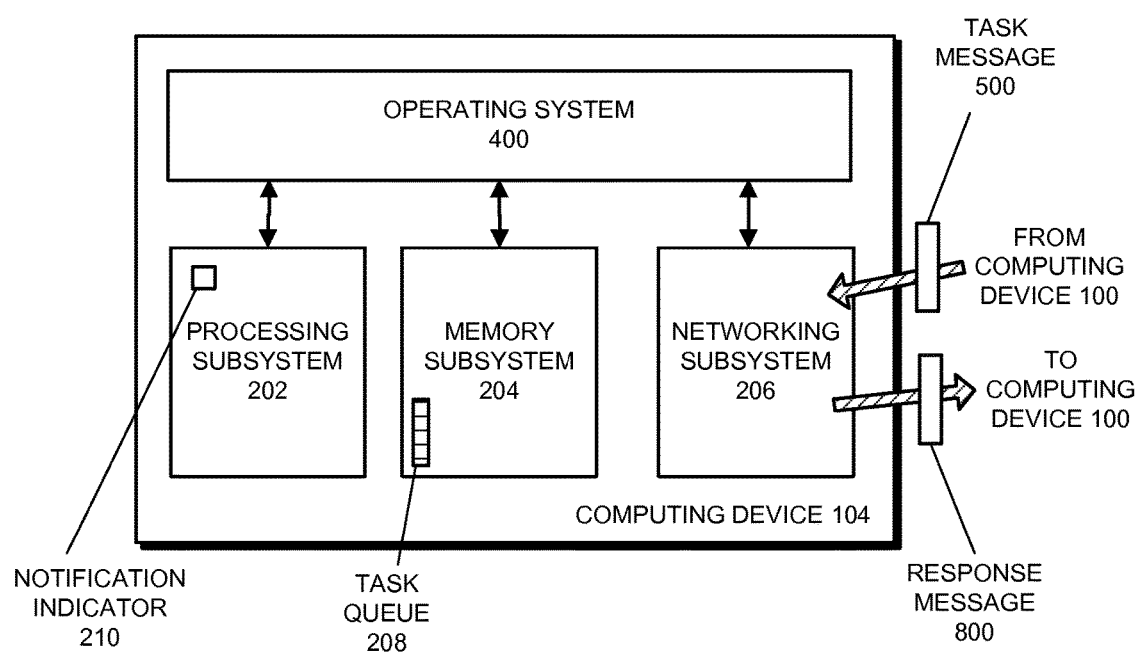
FIG. 8 presents a block diagram illustrating a computing device receiving a task message in accordance with some embodiments.

FIG. 8 presents a block diagram illustrating a receiving computing device (computing device 104 for this example) receiving a task message sent by a sending computing device (computing device 100 for this example) in accordance with some embodiments. Note that the operations shown in FIG. 8 are presented as a general example of functions performed by some embodiments. The operations performed by other embodiments include different operations and/or operations that are performed in a different order. Additionally, although certain functional blocks/mechanisms are used in describing the operations, in some embodiments, other functional blocks/mechanisms may be used. For example, only some of the elements in FIG. 4 are shown in FIG. 8, but in some embodiments, all of the elements would be present.

The operations shown in FIG. 8 start when networking subsystem 206 in computing device 104 receives task message 500 from computing device 100. For example, computing device 100 may send task message 500 in a protocol data unit formatted in accordance with a protocol that computing devices 100 and 104 use to communicate with one another (e.g., RDMA). Networking subsystem 206 processes task message 500 and determines, based on command 502 and/or information 504, that the message is a task message 500. Upon determining that the message is a task message 500, networking subsystem 206 checks task queue 208 to determine if the payload from task message 500 can be written to task queue 208. For this example, it is assumed that networking subsystem 206 determines that the payload from task message 500 cannot be written to the task queue 208 (e.g., no entry 300 is available, task queue 208 cannot be written, etc.).

Upon determining that the task queue 208 is full and/or cannot be written for another reason (busy, invalid, etc.), networking subsystem 206 discards the task message 500 (i.e., halts processing of task message 500, ignores task message 500, deletes task message 500, and/or otherwise discards the task message 500) and sends a response message 800 (e.g., a negative acknowledgement (NACK) or another response message) to computing device 100 indicating that the attempt to write the task information to task queue 208 failed.

Upon receiving response message 800, computing device 100 performs a remedial action. For example, computing device may re-send the task message 500 to computing device 104, may perform the corresponding task in computing device 100 (i.e., instead of offloading the task to computing device 104), and/or may otherwise handle the failure to offload the task to computing device 104.

Sending and Receiving Task Messages in Computing Devices

Figure 9:
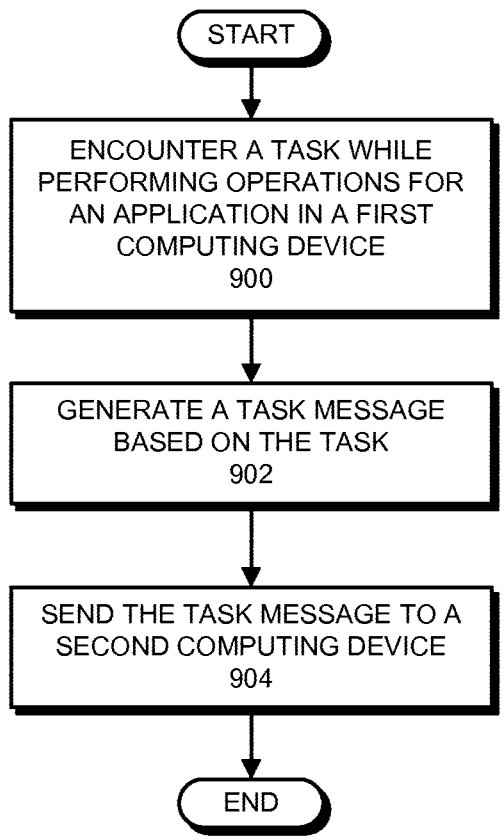
FIG. 9 presents a flowchart illustrating a process for sending a task message from a computing device in accordance with some embodiments.

FIG. 9 presents a flowchart illustrating a process for sending a task message 500 from a computing device in accordance with some embodiments. For the operations in FIG. 9, it is assumed that computing device 100 is the first/sending computing device and computing device 104 is the second/receiving computing device. However, the operations shown in FIG. 9 are presented as a general example of functions performed by some embodiments. The operations performed by other embodiments include different operations and/or operations that are performed in a different order. Additionally, although certain computing devices and functional blocks (e.g., processing subsystems, etc.) are used in describing the process, in some embodiments, other computing devices/functional blocks may perform the operations.

The process shown in FIG. 9 starts when, while performing computational operations for an application, processing subsystem 202 in computing device 100 encounters a task (step 900). For example, the application may configure (e.g., may include program code that configures) processing subsystem 202 to monitor for certain tasks, instructions, function calls, patterns of program code, etc. (generally, "tasks") while performing the computational operations for the application. These tasks may be, for example, included in a list of tasks against which tasks are compared by processing subsystem 202. In these embodiments, a task is "encountered" when a task is found that matches the list of tasks. More generally, a task is encountered when processing subsystem 202 is able to determine that the task is one that is to be offloaded (i.e., sent) to computing device 104 to be performed by computing device 104.

Processing subsystem 202 then generates a task message 500 based on the task (step 902). As described above, task message 500 includes information, e.g., command 502 and information 504, that enables networking subsystem 206 in computing device 104 to determine that a payload of task message 500 includes task information (e.g., task code 302 and metadata 304). The task information from the payload of task message 500 is configured to be written by networking subsystem 206 in computing device 104 into a task queue 208 in computing device 104. In addition, the task message 500 is configured to cause networking subsystem 206 in computing device 104 to trigger a notification indicator 210 in computing device 104 (and perform other operations, as described herein). Based on the triggering of notification indicator 210, processing subsystem 202 in computing device 104 retrieves the task information from task queue 208 and performs the corresponding task. Note that, as described above, networking subsystem 206 in computing device 104 performs processing operations for adding the task information to the task queue and triggers notification indicator 210 within processing subsystem 202 performing processing operations for adding the task information to the task queue and/or triggering notification indicator 210, which can avoid the need for processing subsystem 202 in computing device 104 to be involved in processing task message 500. For example, task message 500 can be configured as an RDMA TASK PUT command, which is processed in networking subsystem 206 in computing device 104 as described above.

Processing subsystem 202 in computing device 100 then sends (via networking subsystem 206 in computing device 100) the task message 500 to computing device 104 using network 102 (step 904).

Figure 10:
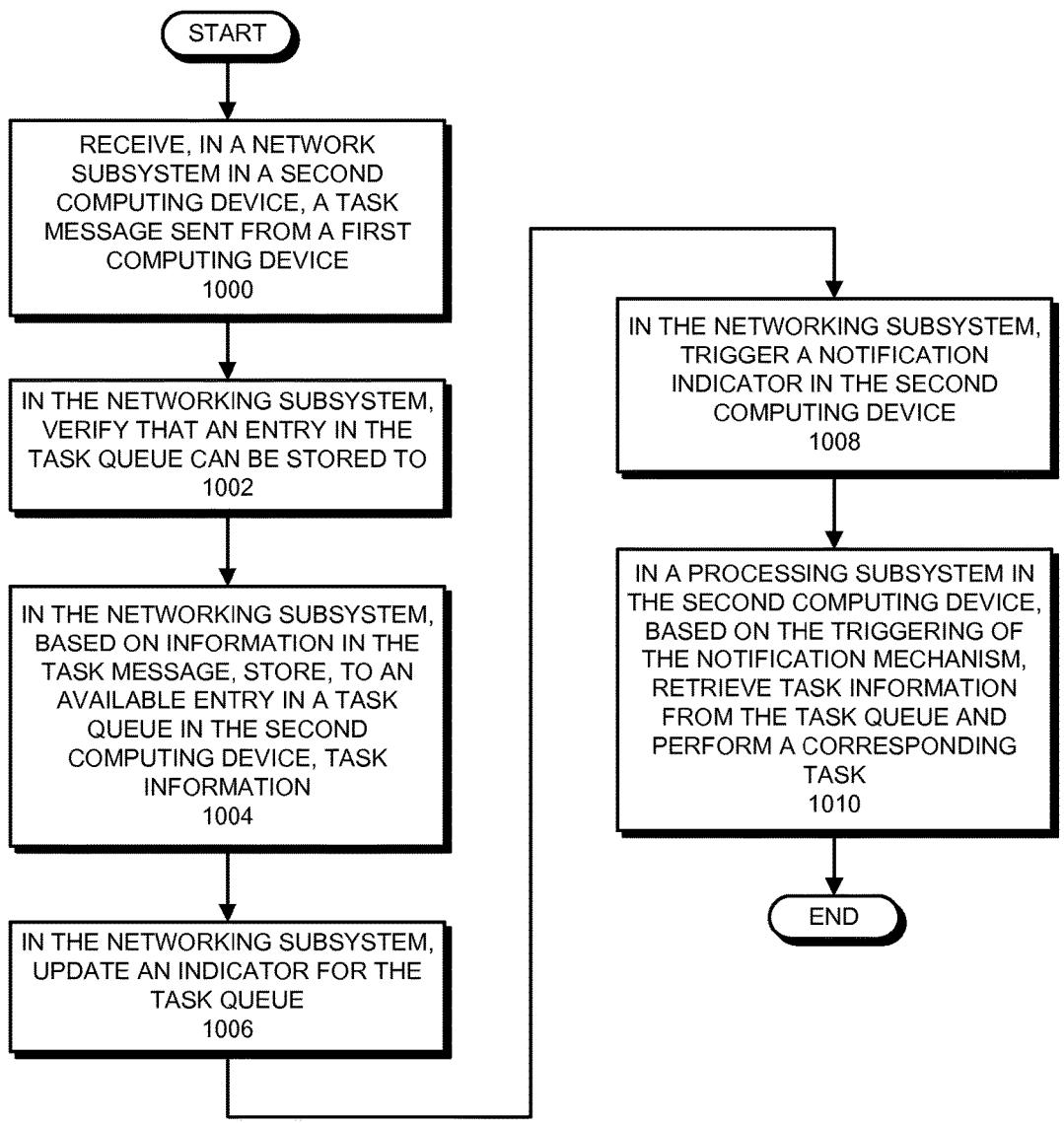
FIG. 10 presents a flowchart illustrating a process for receiving a task message in a computing device in accordance with some embodiments.

FIG. 10 presents a flowchart illustrating a process for receiving a task message in a computing device in accordance with some embodiments. For the operations in FIG. 10, it is assumed that computing device 100 is the first/sending computing device and computing device 104 is the second/receiving computing device. However, the operations shown in FIG. 10 are presented as a general example of functions performed by some embodiments. The operations performed by other embodiments include different operations and/or operations that are performed in a different order. Additionally, although certain computing devices and functional blocks (e.g., processing subsystems, etc.) are used in describing the process, in some embodiments, other computing devices/functional blocks may perform the operations.

The process shown in FIG. 10 starts when networking subsystem 206 in computing device 104 receives, from computing device 100, a task message 500 (step 1000). Task message 500 is generated and sent to computing device 104 from computing device 100 as described above (e.g., in the description of FIGS. 6 and 9, etc.).

Networking subsystem 206 in computing device 104 then verifies that an entry 300 in task queue 208 in computing device 104 can be written (step 1002). For example, networking subsystem 206 can verify that an entry 300 is available, that task queue 208 can be written (is valid, etc.), and/or can otherwise verify that task queue 208 can be written. For this example, it is assumed that task queue 208 can be written.

Next, based on information in the task message 500, networking subsystem 206 in computing device 104 stores task information in an entry 300 in task queue 208 (step 1004). For example, as described above, networking subsystem 206 can store task code 302 and metadata 304, which are acquired from the payload of the task message 500, into the available entry 300 in the task queue 208.

Networking subsystem 206 in computing device 104 then updates an indicator for task queue 208 to indicate that the entry 300 in task queue 208 was stored to (step 1006). For example, networking subsystem 206 can update a pointer for the task queue 208 (update a tail pointer), set a size variable for the task queue to a corresponding value, set an active entry counter to a corresponding value, and/or update another indicator.

Note that, in some embodiments, if networking subsystem 206 in computing device 104 is unable to store the task information in an entry 300 in task queue 208, networking subsystem 206 (and/or another functional block) in computing device 104 can send a response message 800 to computing device 100 indicating that the storage of the task information into task queue 208 was unsuccessful. In addition, in some embodiments, if networking subsystem 206 in computing device 104 is able to store the task information in an entry 300 in task queue 208, networking subsystem 206 (and/or another functional block) in computing device 104 can send a response message 800 to computing device 100 indicating that the storage of the task information into task queue 208 was successful.

In addition to storing task information in an entry 300 in task queue 208 in computing device 104, networking subsystem 206 in computing device 104 may trigger notification indicator 210 in computing device 104 (step 1008). In this way, the networking subsystem 206 can signal processing subsystem 202 that a task is available for processing in task queue 208 in computing device 104. Based on the triggering of notification indicator 210, processing subsystem 202 retrieves the task information from the entry 300 in task queue 208 and performs a corresponding task (step 1010).

Multiple Task Queues

As described above, in some embodiments, a receiving computing device 200 (i.e., a computing device 200 that receives task messages 500) may include multiple processing subsystems 202 (e.g., two or more CPU cores, GPU cores, etc.). In these embodiments, each processing subsystem 202 may be associated with one or more task queues 208 that are used for storing tasks to be performed by each processing subsystem 202. For example, in some embodiments, each processing subsystem 202 may be associated with a low-priority task queue 208 and a high-priority task queue 208 that store low-priority tasks and high-priority tasks, respectively. In some of these embodiments, information 504 in received task messages 500 may include an indication (e.g., a numerical value, a pointer, a base address, etc.) of the task queue 208 to which the task message 500 is destined. In some of these embodiments, networking subsystem 206 makes a determination about a destination task queue 208 based on information 504, task code 302, and/or metadata 304 (alone or in combination with other information).

In some embodiments, a computing device (e.g., computing device 100 and/or 104 in FIG. 1 and/or some portion thereof) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations. In some embodiments, one or all of the hardware modules is included in a functional block such as a processing subsystem, a networking subsystem, a memory subsystem, etc. in a computing device such as computing device 100 and/or 104.

In some embodiments, a data structure representative of some or all of the structures and mechanisms described herein (e.g., computing device 100 and/or 104 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In the following description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method, comprising:
   in a processing subsystem in a first computing device, performing operations comprising:
   encountering a task while performing computational operations for an application;
   generating a task message based on the task, the task message comprising information configured to:
   cause a networking subsystem in a second computing device to store task information in a task queue in the second computing device; and
   cause a processing subsystem in the second computing device to perform a corresponding task upon retrieving the task information from the task queue; and sending the task message to the second computing device via a network connection between the first computing device and the second computing device.

2. The method of claim 1, wherein the information in the task message is further configured to:
cause the networking subsystem to trigger a notification indicator for the processing subsystem in the second computing device, wherein the processing subsystem in the second computing device retrieves the task information from the task queue based on the triggering of the notification indicator.

3. The method of claim 1, wherein the information in the task message is further configured to:
cause the networking subsystem to store the task information in the task queue without causing the processing subsystem in the second computing device to perform processing operations for storing the task information in the task queue.

4. The method of claim 1, further comprising:
receiving a response message from the second computing device when the task information cannot be stored in the task queue; and
performing a remedial action.

5. The method of claim 1, wherein the task information comprises:
a task code that indicates the corresponding task; and
when data is used for performing the corresponding task, one or more identifiers of the data.

6. A method, comprising:
in a networking subsystem in a first computing device, performing operations comprising:
receiving, from a second computing device, a task message; and
based on information in the task message, storing task information in a task queue in the first computing device; and
in a processing subsystem in the first computing device, performing operations comprising:
retrieving the task information from the task queue; and
performing a corresponding task based on the task information.

7. The method of claim 6, further comprising:
in the networking subsystem, performing operations comprising:
based on the task message, triggering a notification indicator; and in the processing subsystem, performing operations comprising:
upon detecting that the notification indicator has been triggered, retrieving the task information from the task queue.

8. The method of claim 6, wherein storing the task information in the task queue comprises:
storing the task information in the task queue without causing the processing subsystem to perform operations for storing the task information in the task queue.

9. The method of claim 6, further comprising:
in the networking subsystem, performing operations comprising:
determining the task information cannot be stored in the task queue;
sending a response message to the second computing device, the response message indicating that the task information could not be stored in the task queue; and
discarding the task message.

10. The method of claim 6, wherein the task information comprises:
a task code that indicates the corresponding task; and
when data is used for performing the corresponding task, one or more identifiers of data.

11. A first computing device, comprising:
a processing subsystem, wherein the processing subsystem performs operations comprising:
encountering a task while performing computational operations for an application;
generating a task message based on the task, the task message comprising information configured to:
cause a networking subsystem in a second computing device to store task information in a task queue in the second computing device; and
cause a processing subsystem in the second computing device to perform a corresponding task upon retrieving the task information from the task queue; and
sending the task message to the second computing device via a network connection between the first computing device and the second computing device.

12. The first computing device of claim 11, wherein the information in the task message is further configured to:
cause the networking subsystem to trigger a notification indicator for the processing subsystem in the second computing device, wherein the processing subsystem in the second computing device retrieves the task information from the task queue based on the triggering of the notification indicator.

13. The first computing device of claim 11, wherein the information in the task message is further configured to:
cause the networking subsystem to store the task information in the task queue without causing the processing subsystem in the second computing device to perform processing operations for storing the task information in the task queue.

14. The first computing device of claim 11, wherein the processing subsystem performs operations comprising:
receiving a response message from the networking subsystem when the task information cannot be stored in the task queue; and
performing a remedial action.

15. The first computing device of claim 11, wherein the task information comprises:
a task code that indicates the corresponding task; and
when data is used for performing the corresponding task, one or more identifiers of the data.

16. A second computing device, comprising:
a processing subsystem; and
a networking subsystem;
wherein the networking subsystem performs operations comprising:
receiving, from a first computing device, a task message; and
based on information in the task message, storing task information in a task queue in the second computing device; and
wherein the processing subsystem performs operations comprising:
retrieving the task information from the task queue; and
performing a corresponding task based on the task information.

17. The second computing device of claim 16, wherein the networking subsystem performs operations comprising:

based on the task message, triggering a notification indicator; and in the processing subsystem, performing operations comprising:

upon detecting that the notification indicator has been triggered, retrieving the task information from the task queue.

18. The second computing device of claim 16, wherein, when storing the task information in the task queue, the networking subsystem stores the task information in the task queue without causing the processing subsystem to perform operations for storing the task information in the task queue.

19. The second computing device of claim 16, wherein the networking subsystem performs operations comprising:

determining the task information cannot be stored in the task queue;

sending a response message to the first computing device, the response message indicating that the task information could not be stored in the task queue; and discarding the task message.

20. The second computing device of claim 16, wherein the task information comprises:

a task code that indicates the corresponding task; and when data is used for performing the corresponding task, one or more identifiers of data.

* * * * *